United States Patent [19]
Zhao

[11] Patent Number: 6,025,852
[45] Date of Patent: Feb. 15, 2000

[54] MANIPULATION OF GRAPHIC STRUCTURES

[76] Inventor: Jianmin Zhao, 25121 41$^{st}$ Dr., Issaquah, Wash. 98029

[21] Appl. No.: 08/653,671

[22] Filed: May 24, 1996

[51] Int. Cl.$^7$ .................................................. G06F 17/50
[52] U.S. Cl. .......................................... 345/474; 345/473
[58] Field of Search ................................... 345/473, 474; 395/99, 95, 90; 364/167.01, 512, 474.24

[56] References Cited

U.S. PATENT DOCUMENTS

| | | | |
|---|---|---|---|
| 4,831,549 | 5/1989 | Red et al. | 364/167.01 |
| 4,949,277 | 8/1990 | Trovato et al. | 395/90 |
| 5,043,929 | 8/1991 | Kramer et al. | 364/512 |
| 5,249,151 | 9/1993 | Chang et al. | 364/474.24 |
| 5,294,873 | 3/1994 | Seraji | 395/95 |
| 5,495,410 | 2/1996 | Graf | 364/167.01 |
| 5,506,949 | 4/1996 | Perrin | 345/473 |
| 5,511,147 | 4/1996 | Abdel-Malek | 395/99 |

OTHER PUBLICATIONS

Foley, James D. Computer Graphics: Principles and Practice 2d ed. (Reading: Addison–Wesley) 1060–1064, 1990.

Hollingum, Jack. "Stimulation, Calibration and Off–line Programming." Industrial Robot 21, No. 5: 20–21, 1994.

Kacala, James. "Robot Programming Goes Off–Line." Machine Design 57: 89–92, 1985.

Girard and Maciejewski, "Computational Modeling for the Computer Animation of Legged Figures," *Computer Graphics,* 19(3):263–270, 1985.

Zhao, Jianmin, "Moving Posture Reconstruction From Perspective Projections of Jointed Figure Motion", *University of Pennsylvania,* IRCS Report No. 93–32, Oct. 1993, pp. 1–143.

Asaithambi, N.S., "Nonlinear Systems", *Numerical Analysis: Theory and Practice,* Chapter 5, 1995, pp. 261–307.

Craig, John J., *Introduction to Robotics: Mechanics and Control,* (1989).

Primary Examiner—Joseph H. Feild
Assistant Examiner—John L. Young
Attorney, Agent, or Firm—Fish & Richardson P.C.

[57] ABSTRACT

Manipulation of a graphic structure having a root, a joint and an end effector to a configuration positioning the structure's end effector at a goal position is aided by determining characteristic configurations for the structure having different distances between the root and the end effector. The characteristic configurations form the basis of a transition function mapping goal distances between the root and goal positions to intermediate configurations, with the intermediate configurations having end effector distances (between the root and end effector) equal to the corresponding goal distances. The intermediate configuration may be reoriented to a final configuration positioning the end effector at the goal position.

22 Claims, 4 Drawing Sheets

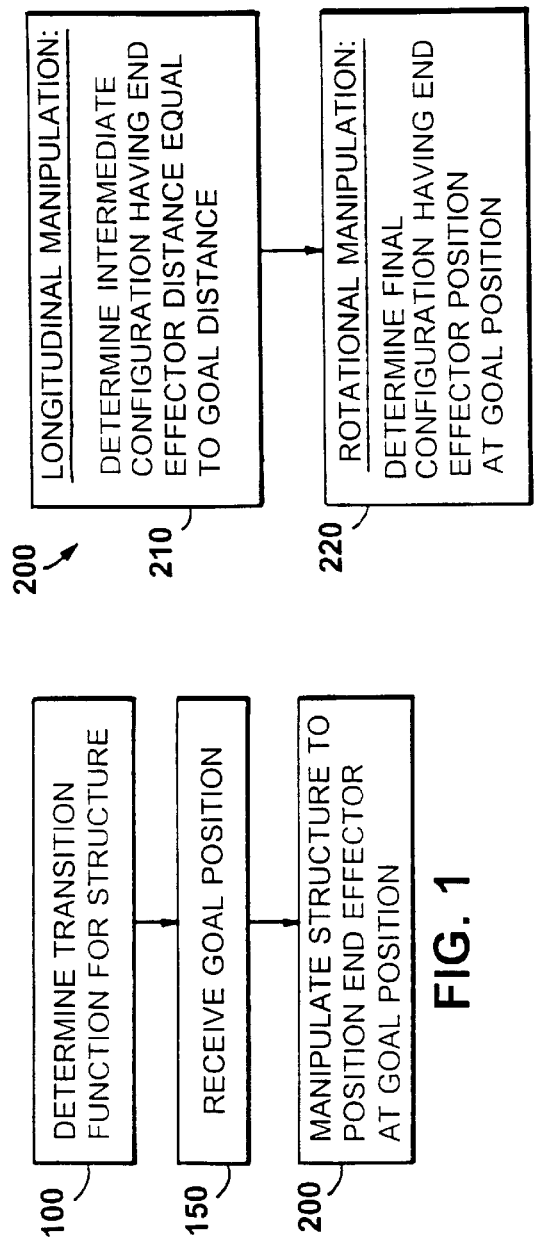
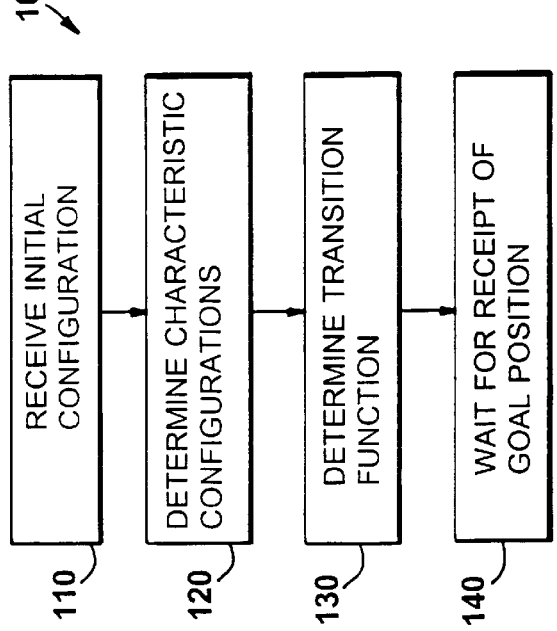
FIG. 1
FIG. 2
FIG. 3

MANIPULATION OF GRAPHIC STRUCTURES

BACKGROUND

This invention relates to manipulation of graphic structures.

As illustrated in FIG. 4, a graphic structure may be represented by a set of segments 415, 425, 435 connected by joints 420, 430, with the joint angles determining the positions of the segments. Kinematics is an approach to structure manipulation, construing a structure (or a part of a structure) as having an iterative branching arrangement, beginning with a root 410 branching off to zero or more joints 420, each of which, in turn, may branch off to zero or more joints 430, and so on, with each branch eventually terminating in an end effector 440.

Graphic structures can be used in computer graphics. For example, a graphic structure may be used in animation to represent an arm, with a root representing the shoulder, joints representing the elbow and the wrist, and an end effector representing the hand.

Forward kinematics addresses the problem: "Assuming a stationary root and given these joint angles for the structure's joints, find the position of the end effectors." Using the arm example, the problem would be to find the position of the hand, given the position of the root and the angles of the elbow and the wrist. Only one configuration of the structure satisfies the given joint angles, and is readily determined by starting at the root and positioning the joints based on the given joint angles until the end effector positions are determined.

Inverse kinematics addresses the reverse problem: "Given these goal positions for the structure's end effectors, find the configuration of the structure that positions the end effectors at the goal positions." Again using the arm example, the problem involves finding angles of the elbow and wrist to place the hand at a specified goal position. Unlike forward kinematics, inverse kinematics addresses a problem that may have multiple solutions, as multiple sets of joint angles may satisfy the placement requirement of the end effectors.

SUMMARY

In general, in one aspect, the invention features aiding the manipulation of a graphic structure having a root, a joint, and an end effector.

Two or more characteristic configurations are determined for the graphic structure, each having different end effector distances between the root and the end effector, and a transition function is determined based on the characteristic configurations for mapping a goal distance between the root and the end effector to an intermediate configuration for the graphic structure.

Certain implementations of the invention may include one or more of the following features. One of the determined characteristic configurations may have an end effector distance that is a minimum distance between the root and the end effectors, and one may have an end effector distance that is a maximum distance between the root and the end effector.

Configurations, each having different end effector distances, may include a first characteristic configuration with a minimum end effector distance, a second characteristic configuration with a maximum end effector distance, and one or more characteristic configurations having intermediate end effector distances.

The transition function may map goal distances (the distance between the root and the end effector) to intermediate configurations by interpolating between characteristic configurations.

The transition function may further map goal distances to intermediate configurations taking into consideration weights assigned to various joints.

In general, in another aspect, the invention features aiding the manipulation of a graphics structure by mapping a goal distance between the root and a specified goal position to an intermediate configuration, having an end effector distance equal to the goal distance, and reorienting the intermediate configuration to a final configuration positioning the end effector at the specified goal position.

In general, in another aspect, the invention enables use of the computer-implemented method through a memory device storing computer-readable instructions for aiding the computer to manipulate the graphic structure.

By precalculating a transition function for manipulating an end effector to any goal distance, when a specific goal position is indicated, the invention reduces the processing required to manipulate the end effector to the specified goal position.

Other features and advantages of the invention will become apparent from the following description and from the claims.

BRIEF DESCRIPTION OF THE DRAWINGS

FIGS. 1–3 are flow diagrams of a method of manipulating a graphic structure.

DESCRIPTION

Figure 4:
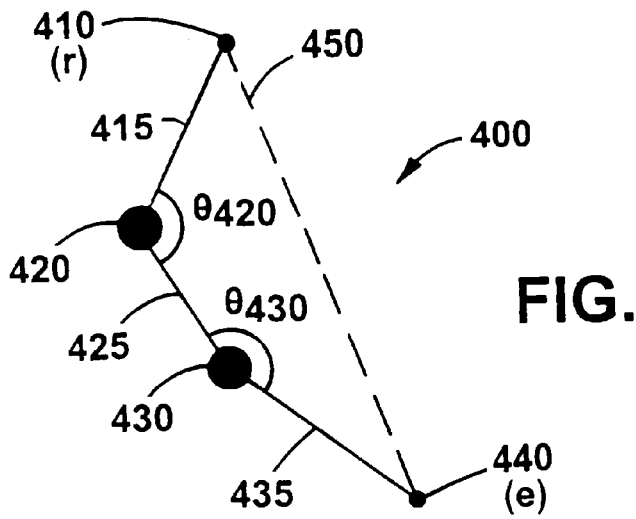
FIG. 4 illustrates a graphic structure.
Figure 8:
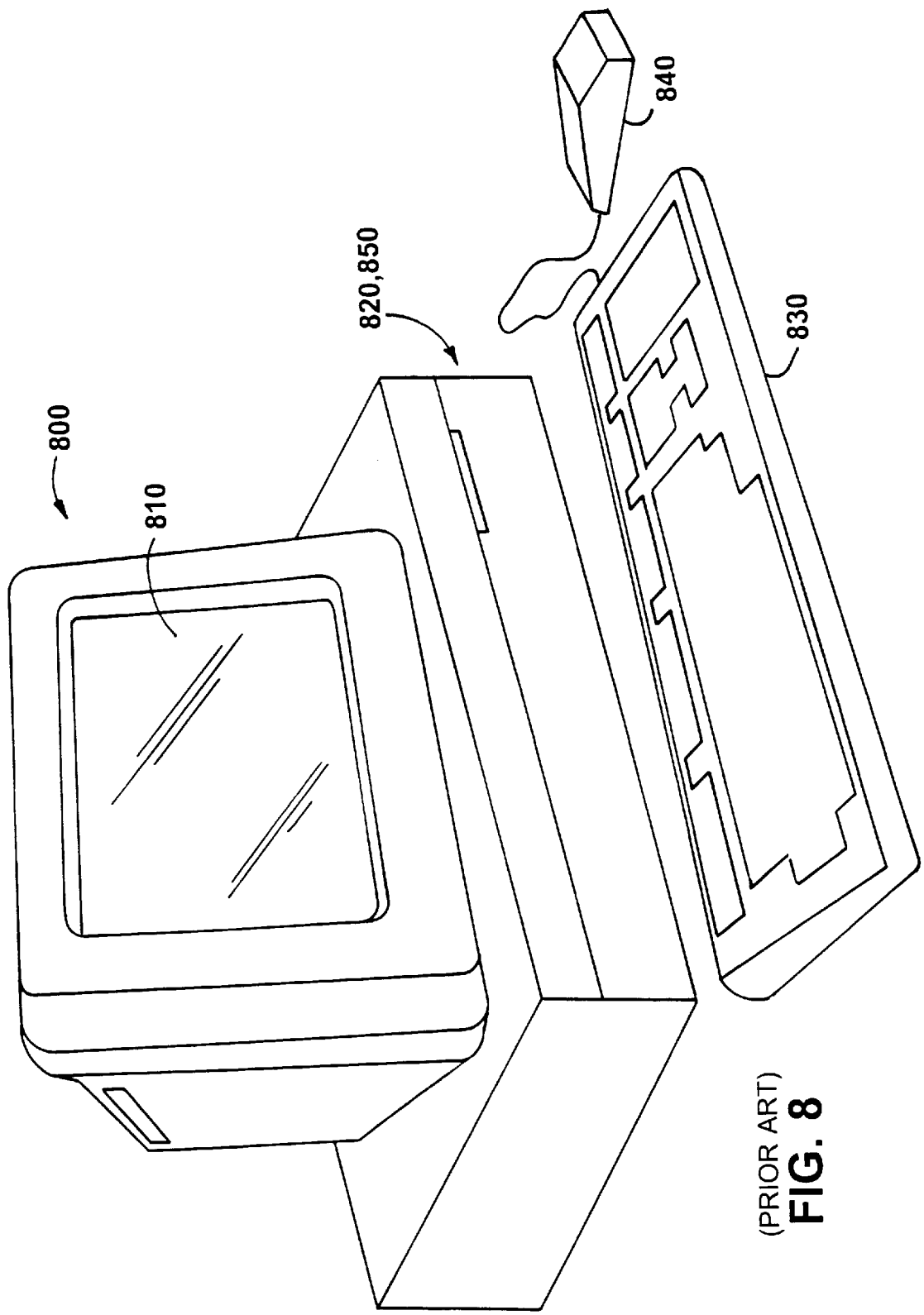
FIG. 8 illustrates a computer system.

The invention addresses manipulation of a non-branching graphic structure (or a non-branching portion of a branching structure) having at least two dimensions, such as the structure illustrated in FIG. 4. The manipulation may be implemented through hardware or firmware, including their equivalents such as ASICs, or through software products, such as a computer program storage device storing instructions for execution by a computer. FIG. 8 illustrates a computer system suitable for implementing the invention, including a workstation 800 with a monitor 810 and a processor 820, input devices such as a keyboard 830 and a mouse 840, and a memory 850 for storing instructions and data for use by the processor 820.

In FIG. 4, keeping the root 410 stationary, a configuration of a structure 400 may be defined by a set of angles, $\theta$, defining each joint angle for every joint of the structure. In FIG. 4, the $\theta$ would consist of $\{\theta_{420}, \theta_{430}\}$, where both $\theta_{420}$ and $\theta_{430}$ may be multidimensional.

Referring to FIG. 1, the invention manipulates a graphic structure to a final configuration that positions its end effector at a specified goal position. The manipulation method is deterministic, providing only one configuration for any end effector position.

The range of a structure's end effector distance (the distance between the root and the end effector—450 in FIG. 4) is limited by the specific joints and segments of the structure. Prior to receiving a specified goal position (150), the manipulation method determines a transition function (100) for mapping a goal distance falling within this range to an intermediate configuration for which the end effector distance equals the goal distance. The transition function maps a goal distance falling outside the possible range of the structure to an intermediate configuration having an end effector distance as close as possible to the goal distance. After receiving a specified goal position (150) the manipulation method uses the previously determined transition function for manipulating the end effector to the specified goal position (200).

Referring to FIG. 2, a structure to be manipulated is defined by the initial configuration (110) of the structure at input. From the initial configuration, the manipulation method determines characteristic configurations for the structure at key end effector distances (120).

Figure 5A:
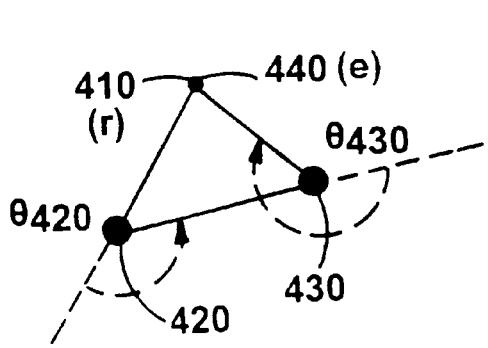
FIGS. 5a–5c, 6a and 6b illustrate configurations for a graphic structure.

FIG. 5a illustrates a "near configuration" for the structure 400 of FIG. 4. The near configuration is one having a minimum end effector distance. The near configuration is represented by a set of angles $\theta_n$ (in this example consisting of $\{\theta_{420}, \theta_{430}\}$) and has an end effector distance $\|e-r\|$ of $\rho(\theta_n)$, or $\rho_n$.

Figure 6A:
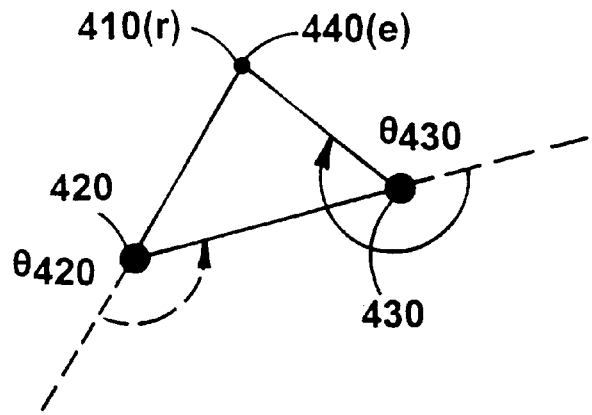
Figure 6B:
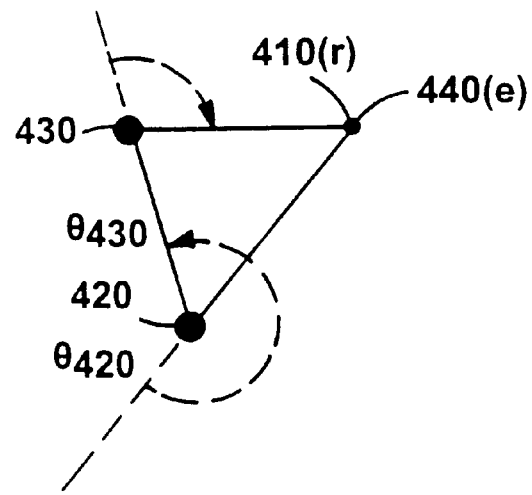

The near configuration may not be unique. FIGS. 6a and 6b illustrate two different near configurations for the structure of FIG. 4. Various methods may be used to determine a near position, as long as the method always produces the same near configuration for any end-effector distance.

For example, a near configuration may be determined by the method explained in Appendix A of Jianmin Zhao, Moving Posture Reconstruction From Perspective Projections of Jointed Figure Motion (1993) (unpublished Ph.D. dissertation, University of Pennsylvania), Appendix A which is incorporated by reference.

Figure 5B:
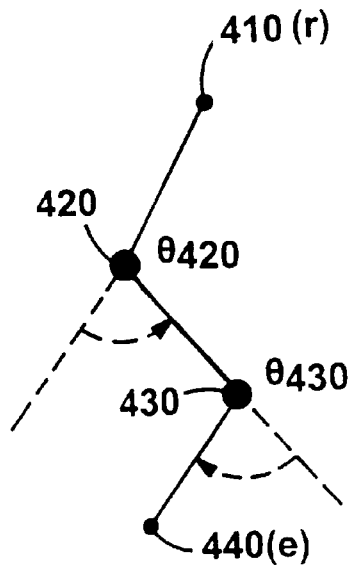

FIG. 5b illustrates a "rest configuration," represented by the set of angles $\theta_r$, which generally describes the initial configuration of the structure. The end effector distance $\|e-r\|$ for the rest configuration is $\rho(\theta_r)$ or $\rho_r$. Because the rest configuration may affect the manipulation of the structure, the rest configuration preferably may be adjusted by the user as needed for a particular application.

Figure 5C:
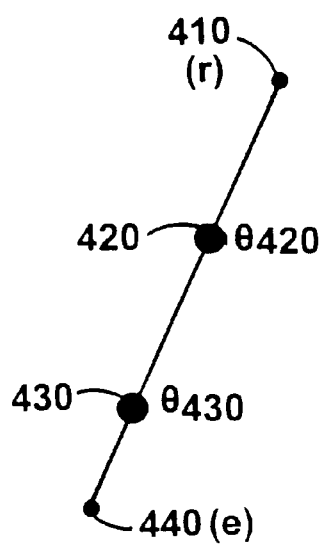

FIG. 5c illustrates a "far configuration" set of angles $\theta_f$ which maximizes the end effector distance. This maximum distance is designated by $\rho(\theta_f)$ or $\rho_f$. Unlike the near configuration, the far configuration is unique. Because the transition function determines configurations solely based on end effector distances, the characteristic configurations indicate only the relative positions of the joints and end effector, not the actual coordinate positions of the joints and end effector. Accordingly, in determining the far configuration, the root is held stationary and each segment is sequentially extended.

The characteristic configurations form the basis for determining a transition function (130) for mapping a goal distance to an intermediate configuration. For example, the transition function for the structure of FIG. 4 maps $\rho_n$ to $\theta_n$, $\theta_r$ to $\theta_r$, and $\rho_f$ to $\theta_f$. For distances less than $\rho_n$, because $\theta_n$ by definition has the minimum possible end effector distance, the closest configuration is $\theta_n$; similarly, for distances greater than $\rho_f$, the closest configuration is $\theta_f$. For distances between $\rho_n$ and $\rho_f$, the transition function interpolates a configuration from the characteristic configurations.

A variety of interpolation methods may be used. For example, linear interpolation may determine a configuration for a specified distance as an interpolation between the characteristic configuration having the closest smaller end effector distance and the characteristic configuration having the closest greater end effector distance.

For example, a transition function $\theta$ mapping a distance x to a configuration $\theta$ may take the form:

$$\theta(x) = \theta_n; \text{if } x \leq \rho_n;$$
$$\theta_r; \text{if } x = \rho_r;$$
$$\theta_f; \text{if } x \geq \rho_f;$$
$$\text{else:} \quad (1-t)\theta_1 + t\theta_2;$$

where: if $\rho_n < x < \rho_r$:
$$\theta_1 = \theta_n \text{ and } \theta_2 = \theta_r; \text{ and}$$

if $\rho_r < x < \rho_f$:
$$\theta_1 = \theta_r \text{ and } \theta_2 = \theta_f;$$

and: $t$ is an unknown variable ranging from [0, 1], where:
$$t = 0 \text{ at } x = \rho(\theta_1); \text{ and}$$
$$t = 1 \text{ at } x = \rho(\theta_2).$$

Referring to FIGS. 1 and 3, after a specified goal position is received (150), manipulating the end effector to the goal position (200) includes two steps. A longitudinal manipulation (210) uses the transition function to determine an intermediate configuration for the structure having an end effector distance equal to the goal distance. A rotational manipulation (220) then rotates the intermediate configuration about the root to a final configuration that places the end effector at the goal position.

Figure 7:
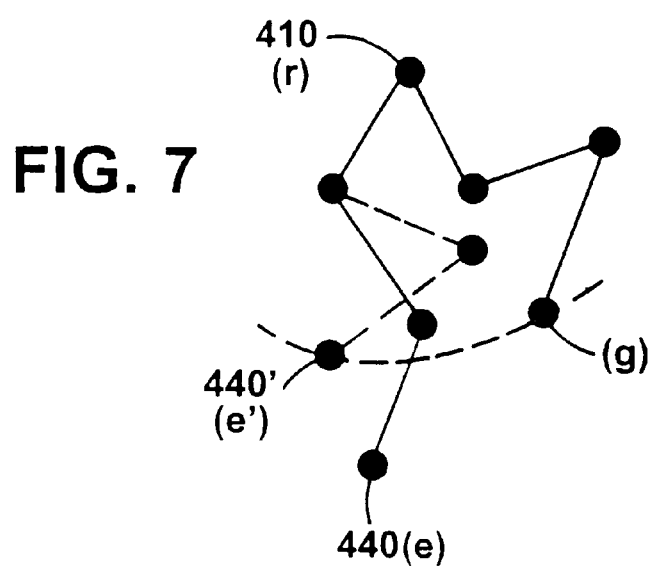
FIG. 7 shows manipulation steps for a graphic structure.

An application of this approach to the structure of FIG. 4 is illustrated in FIG. 7, in which g denotes a received goal position. The longitudinal manipulation uses the predetermined transition function to determine an intermediate configuration that brings e to position e', having the same distance from r as does g. The rotational manipulation rotates the intermediate configuration about the root until the position of the end effector e' reaches goal position g.

The longitudinal manipulation attempts to find an intermediate configuration defined by a set of joint angles $\theta_g$ having an end effector distance equal to the goal distance $\rho_g$, determined by calculating $\|g-r\|$, the distance from the root to g. The transition function is applied to $\rho_g$ to find the intermediate configuration $\theta_g$ placing end effector e at a distance $\rho_g$ from r.

In this example using the transition function described above:

if $\rho_g \leq \rho_n$; then $\theta_g = \theta_n$;

if $\rho_g = \rho_r$; then $\theta_g = \theta_r$; and if $\rho_g \geq \rho_f$; then $\theta_g = \theta_f$;

Otherwise, $\theta_g$ must be determined by interpolation, and the problem is reduced to finding a value for t such that the resulting configuration has an end effector distance equal to the goal distance.

One method of determining t is to use the Newtonian method to solve the non-linear equation equating the goal distance with the end effector distance of the linear interpolation between two characteristic configurations. The application of the Newtonian method is explained in texts such as N. S. Asaithambi, *Numerical Analysis: Theory and Practice*, Ch. 5 (1995).

At completion of the longitudinal manipulation, the end effector of the intermediate configuration is at position e' on the circle (or sphere) defined by g about root r (or at the bounds of the structure's range of configurations ($\theta_n$ or $\theta_f$) if the goal distance is not within the range [$\rho_n$, $\rho_f$]). The rotational manipulation (220) rotates the intermediate configuration about the root joint to a final configuration, positioning e' on the radial line extending from root r to goal g. Any of a variety of rotational methods may be used. Rotations are discussed in John J. Craig, *Introduction to Robotics: Mechanics and Control* (1989).

Other embodiments are within the scope of the following claims.

For example, the manipulation of a non-branching structure may be customized by enabling a user to specify additional rest configurations in addition to the initial configuration, as described above. The transition function will map a goal distance equal to the distance between the root and the end effector of a specified rest configuration to that rest configuration. This feature allows a user to more closely control the longitudinal manipulation of the structure. A limitation is that a user may not be able to specify more than one configuration for a given end effector distance, as the transition function used in the longitudinal manipulation is determined such that the structure is manipulated through each of the characteristic configurations as the end effector distance ranges from $\rho_n$ to $\rho_f$.

Another optional feature for customizing the manipulation of the structure is assigning weights to each joint to affect the relative rate at which the transition function alters the various joint angles in the longitudinal manipulation of the structure.

Other variations are possible. For example, instead of the linear interpolation used by the transition function, a quadratic interpolation may be used to connect the near position, the rest position(s), and the far position.

What is claimed is:

1. A computer-implemented method for aiding manipulation of a graphic structure having a root, at least one joint, and an end effector, the method comprising:
    determining two or more characteristic configurations for the graphic structure, each having a different end effector distance between the root and the end effector; and
    determining a transition function based on the characteristic configurations, for mapping goal distances between the root and the end effector to intermediate configurations.

2. The method of claim 1, wherein one of the determined characteristic configurations has an end effector distance that is a minimum distance between the root and the end effector.

3. The method of claim 1, wherein one of the determined characteristic configurations has an end effector distance that is a maximum distance between the root and the end effector.

4. The method of claim 1, further comprising determining three or more characteristic configurations having different end effector distances, including a first characteristic configuration having an end effector distance of a minimum distance between the root and the end effector and a second characteristic configuration having an end effector distance of a maximum distance between the root and the end effector, and wherein the remaining characteristic configurations have end effector distances that are intermediate distances between the root and the end effector.

5. The method of claim 4, wherein the transition function maps goal distances to intermediate configurations by interpolating between characteristic configurations.

6. The method of claim 1, wherein the transition function maps goal distances to intermediate configurations by interpolating between characteristic configurations.

7. The method of claim 1, wherein the graphic structure has two or more joints, each joint having an assigned weight, and the transition function maps goal distances to intermediate configurations in accordance with the assigned weights.

8. The method of claim 1, further comprising the steps of:
    using the transition function to map a distance between the root and a specified goal position to an intermediate configuration; and
    reorienting the intermediate configuration to a final configuration positioning the end effector at the specified goal position.

9. The method of claim 1 further comprising, inputting a goal distance to the transition function to determine an intermediate configuration of the graphic structure.

10. The method of claim 1 wherein the transition function comprises a function that determines a set of angles that configure the graphic structure.

11. A computer-implemented method for aiding manipulation of a graphic structure having a root, at least one joint, and an end effector to a final configuration positioning the end effector at a goal position, the method comprising:
    mapping a goal distance between the root and the goal position to an intermediate configuration for the graphic structure using a predetermined transition function, wherein the intermediate configuration has an end effector distance between the root and the end effector equal to the goal distance;
    determining the final configuration for the graphic structure by reorienting the intermediate configuration such that the final configuration positions the end effector at the goal position.

12. A memory device storing computer-readable instructions for aiding a computer to manipulate a graphic structure having a root, at least one joint, and an end effector, the instructions comprising:
    instructions for determining two characteristic configurations for the graphic structure, having two different end effector distances between the root and the end effector; and
    instructions for determining a transition function based on the characteristic configurations, for mapping goal distances between the root and the end effector to intermediate configurations for the graphic structure.

13. The memory device of claim 12, wherein one of the determined characteristic configurations has an end effector distance that is a minimum distance between the root and the end effector.

14. The memory device of claim 12, wherein one of the determined characteristic configurations has an end effector distance that is a maximum distance between the root and the end effector.

15. The memory device of claim 12, further comprising instructions for determining three or more characteristic configurations having different end effector distances, including a first characteristic configuration having an end effector distance of a minimum distance between the root and the end effector and a second characteristic configuration having an end effector distance of a maximum distance between the root and the end effector, and wherein the remaining characteristic configurations have end effector distances that are intermediate distances between the root and the end effector.

16. The memory device of claim 15, wherein the transition function maps goal distances to intermediate configurations by interpolating between characteristic configurations.

17. The memory device of claim 12, wherein the transition function maps goal distances to intermediate configurations by interpolating between characteristic configurations.

18. The memory device of claim 12, wherein the graphic structure has two or more joints, each joint having an assigned weight, and the transition function maps goal distances to intermediate configurations in accordance with the assigned weights.

19. The memory device of claim 12, further comprising:
   instructions for using the transition function to map a distance between the root and a specified goal position to an intermediate configuration; and
   instructions for reorienting the intermediate configuration to a final configuration positioning the end effector at the goal position.

20. A memory device storing computer-readable instructions for aiding a computer to manipulate a graphic structure having a root, at least one joint, and an end effector to a final configuration positioning the end effector at a goal position, the instructions comprising:
   instructions for determining an intermediate configuration of the graphic structure based on a predetermined transition function that maps goal distances between the root and the end effector to intermediate configurations of the graphic structure, the intermediate configuration having a distance between the root and the end effector substantially equal to the distance between the root and the goal position; and
   instructions for determining the final configuration for the graphic structure by reorienting the intermediate configuration to a final configuration positioning the end effector at the goal position.

21. A computer-implemented method for aiding manipulation of a graphic structure having a root, a joint, and an end effector, the method comprising:
   determining a minimum characteristic configuration having an end effector distance that is a minimum possible distance between the root and the end effector;
   determining a maximum characteristic configuration having an end effector distance that is a maximum possible distance between the root and the end effector;
   determining a transition function based on the minimum and maximum characteristic configurations, the function mapping goal distances between the root and the end effector to configurations of joints of the graphic structure;
   determining different joint configurations of the graphic structure by inputting different goal distances between the root and the end effector to the transition function.

22. The method of claim 21, further comprising after determining a configuration of the graphic structure, rotating the determined configuration.

* * * * *